(12) United States Patent
Gezgin et al.

(10) Patent No.: US 6,338,397 B1
(45) Date of Patent: Jan. 15, 2002

(54) DEVICE AND PROCEDURE FOR THE AUTOMATIC FIXING OF A LINING WEAR INDICATOR BEND

(75) Inventors: Tanil Gezgin, Ovelgoenne; Horst Kontants, Oldenburg; Herman Brauer, Barssel; Manfred Knoetig, Nordenham, all of (DE)

(73) Assignee: Leoni Automotive Leads GmbH & Co. KG (DE)

( * ) Notice: Subject to any disclaimer, the term of this patent is extended or adjusted under 35 U.S.C. 154(b) by 0 days.

(21) Appl. No.: 09/609,377

(22) Filed: Jul. 3, 2000

(30) Foreign Application Priority Data

Jul. 1, 1999 (DE) .......................................... 199 30 529

(51) Int. Cl.[7] .............................................. F16D 66/02
(52) U.S. Cl. .............................. 188/1.11 L; 188/1.11 E
(58) Field of Search ...................... 189/1.11 W, 1.11 L, 189/1.11 E; 340/454

(56) References Cited

U.S. PATENT DOCUMENTS 5,513,726 A * 5/1996 Thompson et al. ........ 188/1.11
5,839,545 A * 11/1998 Preston et al. .......... 188/1.11 L
6,095,290 A * 8/2000 Takanashi ............... 188/1.11 L
6,179,091 B1 * 1/2001 Takanashi ............... 188/1.11 L

FOREIGN PATENT DOCUMENTS

| DE | 0464347 | * | 5/1991 |
| DE | 40 36 400 A1 | | 5/1992 |

* cited by examiner

Primary Examiner—Christopher P. Schwartz

(57) ABSTRACT

A device according to the invention for the automatic fixing of bend B of a lining wear indicator, in particular for a motor vehicle brake, comprises a wire that is embedded in a plastic extrusion-coated component. A spacer and an insert are also embedded with the wire in the plastic extrusion-coated component. The procedure of the invention includes laying the wire along the spacer; positioning the spacer 3 with the wire into a hollow cylindrical portion of the insert; and bending the insert. Additionally, the bent insert can be placed in an injection mold; a plastic extrusion coating can be applied to at least part of the insert 4, and the coated, bent lining wear indicator can be removed from the mold.

19 Claims, 4 Drawing Sheets

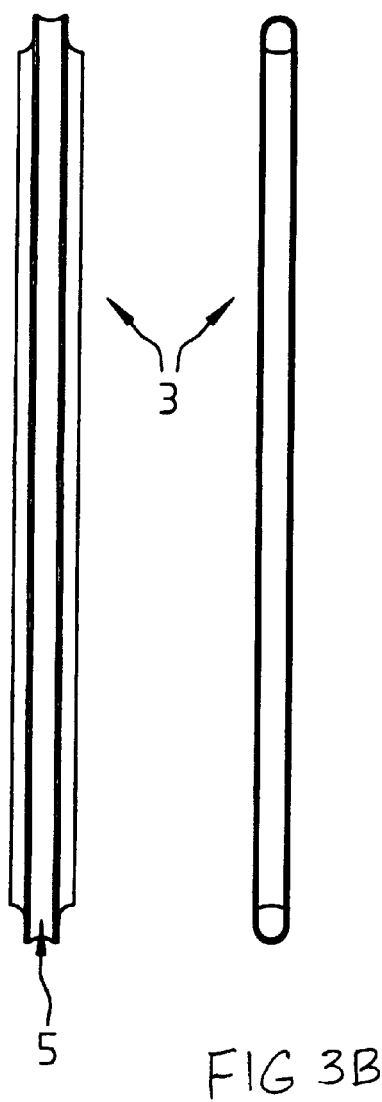
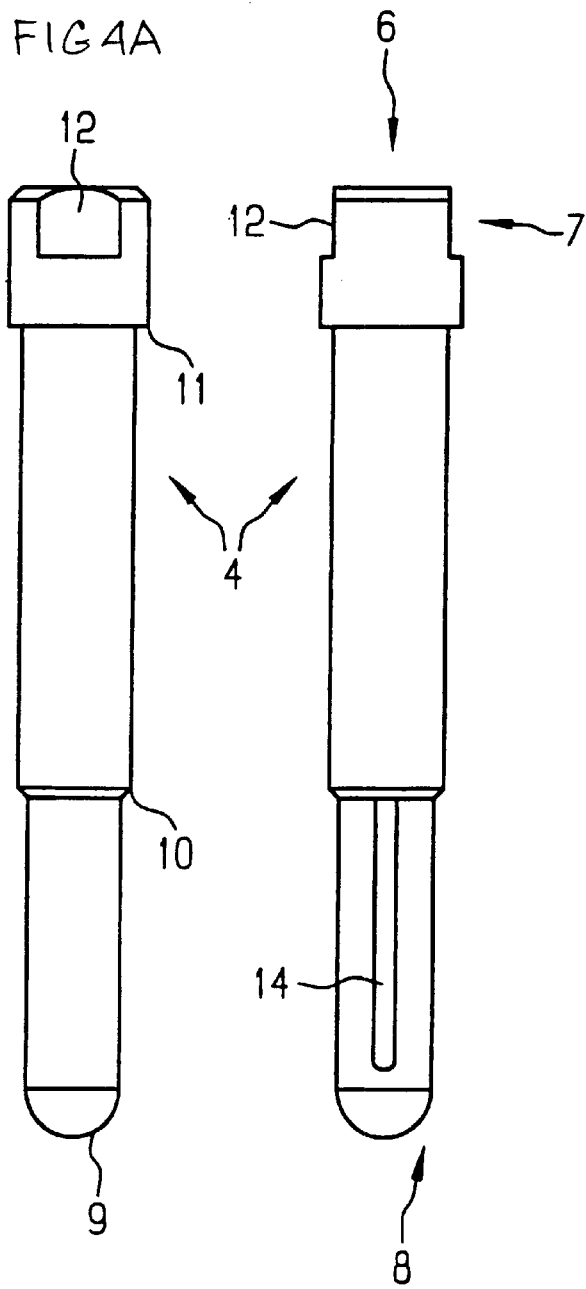

FIG 6
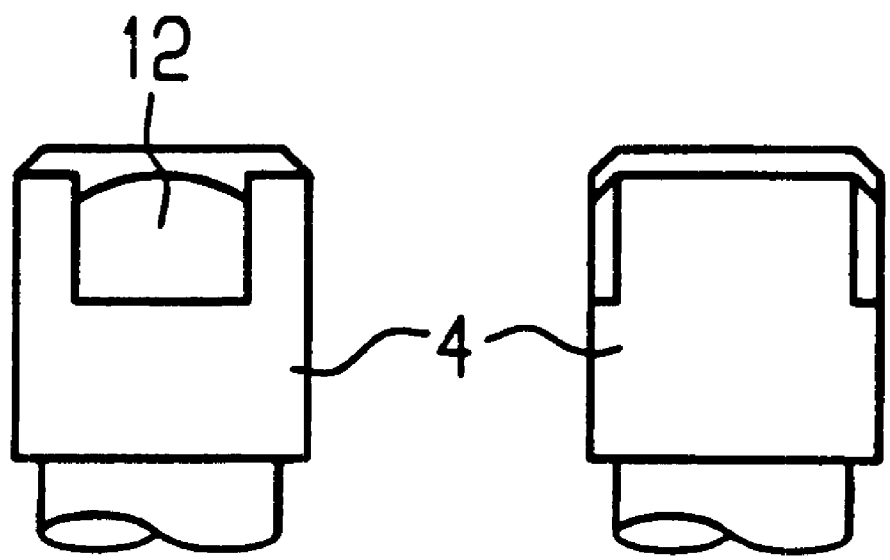
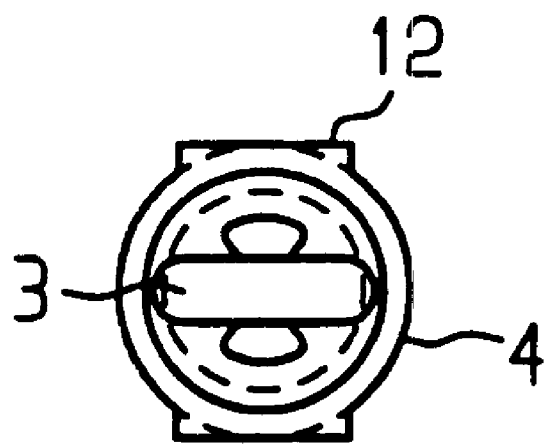

DEVICE AND PROCEDURE FOR THE AUTOMATIC FIXING OF A LINING WEAR INDICATOR BEND

CROSS REFERENCE TO RELATED APPLICATIONS

This application claims the benefit of priority based on German Application No. 19930529.3, filed Jul. 1, 1999, which is incorporated by reference herein in its entirety.

BACKGROUND OF THE INVENTION

This invention is directed to a device and a procedure for automatically fixing the bend in a motor vehicle brake lining wear indicator.

Conventionally, the bend of a lining wear indicator for a motor vehicle brake is produced by hand, i.e., manually. Referring to FIG. 1, wire 1' is bent by hand in a conventional bending device (not shown). Then, the bent wire 1' is inserted into an injection mold, aligned, and extrusion-coated with plastic to produce a plastic extrusion-coated component 2'.

This conventional device and this manual procedure have a number of disadvantages. For example, when wire 1' is bent by hand in a conventional bending device, the wire 1' may be damaged. Also, manual bending is time-consuming, and the insertion and alignment of the bent wire 1' into the injection mold are complicated.

A conventional device that automatically fixes a lining wear indicator bend is disclosed in German Patent No. 40 36 400 A1. In this conventional device, a wire is looped around a spacer and fixed there to produce a pre-mounted unit. This pre-mounted unit is then extrusion coated with plastic.

It is desirable to create a device and a procedure for automatically fixing a lining wear indicator bend in which a lining wear indicator wire can be reliably positioned without auxiliary devices.

SUMMARY OF THE INVENTION

The invention is achieved by providing a bent lining wear indicator for vehicle brakes. The lining wear indicator comprises a spacer providing a bending form; a wire contiguously engaging the spacer; an insert generally surrounding the wire contiguously engaging the spacer; and a coating encapsulating at least a portion of the insert generally surrounding the wire contiguously engaging the spacer.

The invention is also achieved by providing a braking arrangement for a rotating body. The braking arrangement comprises a lining adapted to contiguously engage the rotating body during braking, the lining having an initial dimension that is reduced to a minimum dimension due to the braking; and a bent lining wear indicator signaling that the lining has been reduced to the minimum dimension. The lining wear indicator includes a spacer providing a bending form; a wire contiguously engaging the spacer; an insert generally surrounding the wire contiguously engaging the spacer; and a coating encapsulating at least a portion of the insert generally surrounding the wire contiguously engaging the spacer.

The invention is additionally achieved by providing a method of automatically manufacturing a bent lining wear indicator for vehicle brakes. The method comprises providing a spacer having a longitudinal axis and at least one recess extending parallel to the axis; producing a first sub-assembly by laying a wire in the at least one recess along the spacer; producing a second sub-assembly by positioning the sub-assembly inside a hollow cylindrical insert; and producing a third sub-assembly by bending the second sub-assembly.

Advantages of the claimed invention include achieving a greater degree of automation and reliably preventing damage to the wire.

BRIEF DESCRIPTION OF THE DRAWINGS

The accompanying drawings, which are incorporated herein and constitute part of this specification, illustrate presently preferred embodiments of the invention, and, together with the general description given above and the detailed description given below, serve to explain features of the invention.

FIG. 3A shows a side view of a spacer according to the claimed invention.

FIG. 3B shows a front view of the spacer shown in FIG. 3A.

FIG. 4A shows a front view of an insert according to the claimed invention.

FIG. 4B shows a side view of the insert shown in FIG. 4A.

FIG. 6 shows three views of an alternative embodiment of an insert according to the claimed invention.

DETAILED DESCRIPTION OF THE PREFERRED EMBODIMENT

Figure 2:
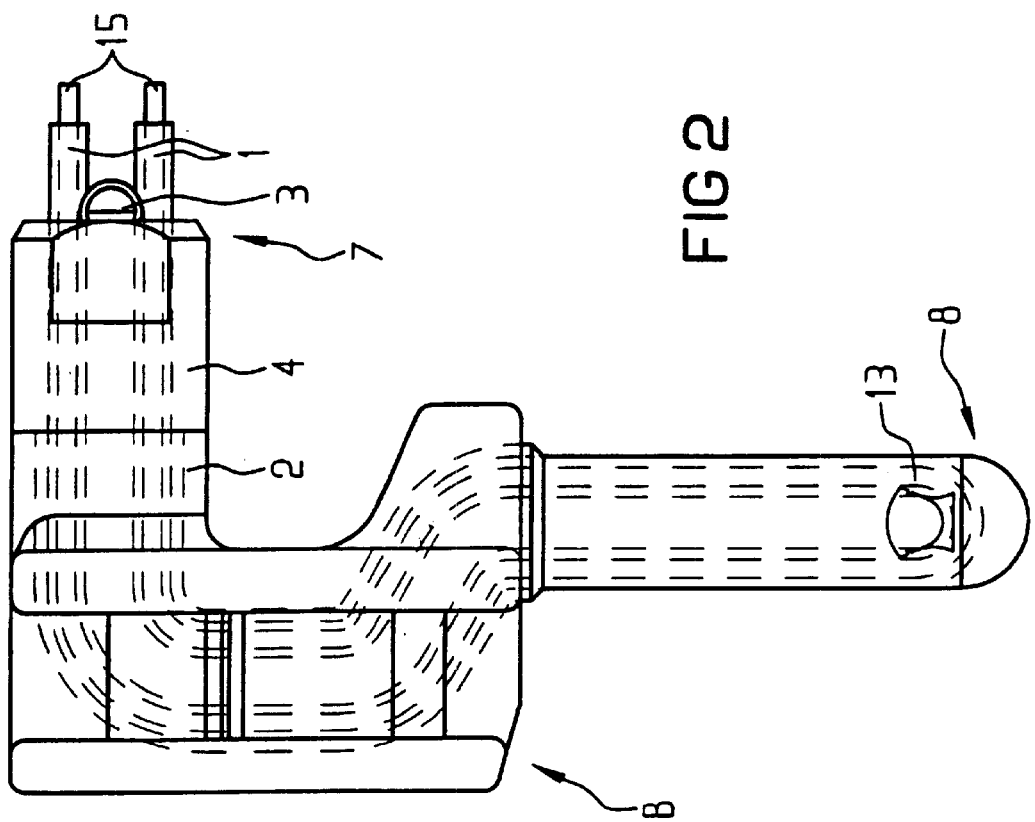
FIG. 2 shows a view of a bent lining wear indicator according to the claimed invention.
Figure 1:
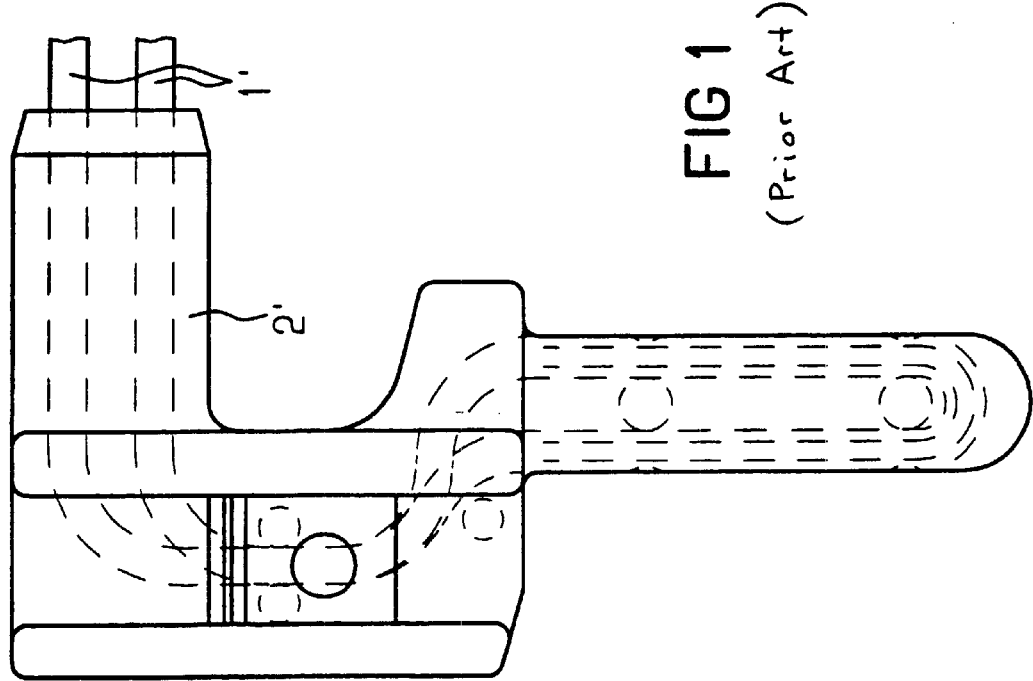
FIG. 1 is a plan view of a conventional lining wear indicator.

Referring to FIG. 2, a lining wear indicator according to the claimed invention, which can be for a motor vehicle brake, includes a bend B. A wire 1, a spacer 3, and an insert 4 are embedded in plastic extrusion-coating component 2. Of course, forming processes other than extrusion coating, and materials other than plastic, can be substituted provided that the substitutes provide similar characteristics to the lining wear indicator. FIG. 4 shows a sub-assembly of the lining wear indicator prior to coating.

Wire 1, which can conduct electricity, is bent around spacer 3 to produce bight 13. Wire 1 is laid into recess 5 on spacer 3. Recess 5 runs in an axial direction and has a transverse cross-section shaped to correspond with the cross-sectional shape of the wire 1. For example, with additional reference to FIGS. 3A and 3B, the cross-section of recess 5 can be a segment of a circle having a radius of curvature that corresponds to the radius of wire 1 having a circular cross-section. The recess can extend along substantially the entire longitudinal length of spacer 3. And additional faces, or an entire perimeter, of the spacer 3 can also include the recess 5.

Spacer 3 with the wire 1 lying in the recess 5 is positioned inside a hollow portion 6 of the insert 4. The insert 4 includes the hollow portion 6, which can be a cylinder, an opening at a first end 7, and a closed portion at a second end 8. Spacer 3 with the wire 1 is introduced into the insert 4 through the opening at the first end 7. It can be determined via a registry portion of the insert 4, e.g., at least one slot 14, whether spacer 3 has been inserted correctly and completely into the insert 4.

The exterior of the second end 8 of the insert 4 can have the shape of a hemisphere 9. Between the first and second ends 7,8, the insert 4 can have a shoulder 10 that, in the illustrated embodiment, roughly defines the area reached by plastic extrusion-coated component 2. Of course, the second end 8 can have shapes other than the hemisphere 9, and the extent of the extrusion coating area, i.e., with respect to the location of shoulder 10, can be adjusted as required.

At the first end 7 of insert 4 there is an alignment portion 11, which can include a thickened cylindrical section of the insert 4. The alignment portion 11 can include one or more flat surfaces 12. Two diametrically opposed flat surfaces 12 are illustrated.

Figure 5:
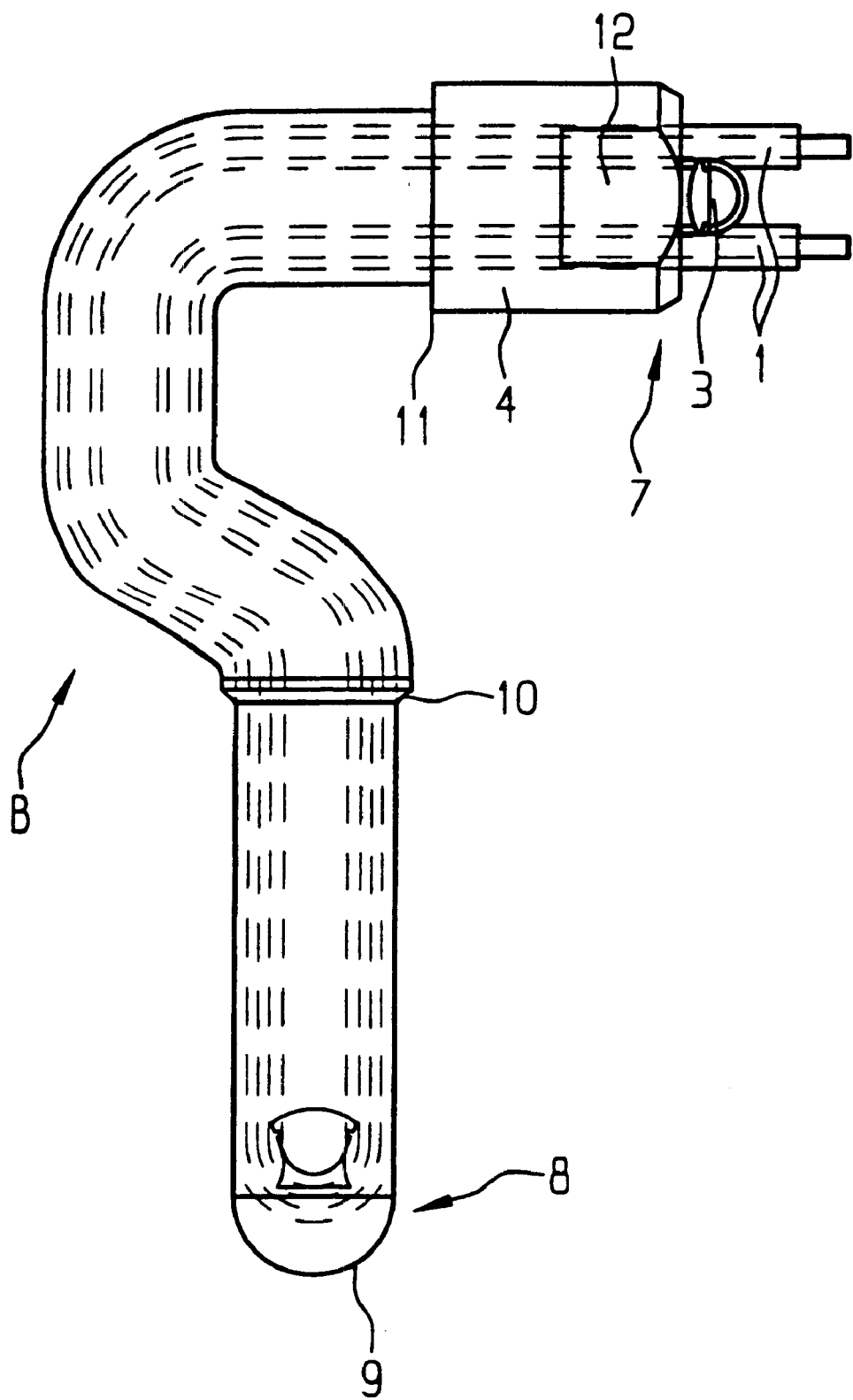
FIG. 5 shows a view of a sub-assembly according to the claimed invention before extrusion coating.

These flat surfaces 12 areas act as alignment guides during bending. An alternative design for the flat surfaces 12 is shown in FIG. 5. Of course, features other than a flat surface can be used to provide alignment.

The method of manufacturing the lining wear indicator according to the claimed invention will now be described. The wire 1 is laid along the spacer 3 (this process can be automated). The recesses 5 facilitate the correct relationship of the wire 1 with respect to the spacer 3. The spacer 3 and the wire 1, which can be considered a first sub-assembly, are then inserted, via the opening at the first end 7 of the insert 4, into the hollow cylindrical portion 6 (this process can also be automated and interrelated with laying the wire 1 along the space 3). This creates what can be considered a second sub-assembly. Whether the first sub-assembly is located correctly in the insert 4 can be checked via the slot 14. Bending the second sub-assembly in a bending device (not shown), which creates what can be considered a third sub-assembly, can also be automated and interrelated to the previous sub-assembly steps.

Additionally, the third sub-assembly can be coated to create what can be considered a fourth sub-assembly. In particular, the third sub-assembly can be placed in an injection mold (not shown), coated with plastic (or an equivalent material) by an extrusion-coating technique (or an equivalent technique), and thereafter removed from the injection mold.

In a braking arrangement, the lining wear indicator can be incorporated into a motor vehicle brake. Hemisphere 9 is arranged in such a way that, when the brake lining wears down from an initial thickness to a reduced thickness, the area between hemisphere 9 and shoulder 10 is also worn down. The lower limit of the wear of the brake lining can be indicated when the wire 1 is broken by the wearing process. An electrical circuit (not shown) that is connected to wire 1 via connectors 15 can detect breaking the wire 1, and alert the driver of the motor vehicle to this situation.

While the present invention has been disclosed with reference to certain preferred embodiments, numerous modifications, alterations, and changes to the described embodiments are possible without departing from the sphere and scope of the present invention, as defined in the appended claims. Accordingly, it is intended that the present invention not be limited to the described embodiments, but that it have the full scope defined by the language of the following claims, and equivalents thereof.

What is claimed is:

1. A bent lining wear indicator for vehicle brakes, the lining wear indicator comprising:
   a spacer providing a bending form;
   a wire contiguously engaging the spacer;
   an insert generally surrounding the wire contiguously engaging the spacer; and
   a coating encapsulating at least a portion of the insert generally surrounding the wire contiguously engaging the spacer.

2. The lining wear indicator as in claim 1, wherein the insert includes a generally cylindrical hollow portion generally surrounding the wire contiguously engaging the spacer.

3. The lining wear indicator as in claim 2, wherein the insert includes an opening at a first end of the hollow portion and a closed portion at a second end of the hollow portion.

4. The lining wear indicator as in claim 3, wherein the wire includes a bight proximate the second end relative to the first end.

5. The lining wear indicator as in claim 4, wherein the insert includes a registry portion indicating the proximity of the bight to the second end.

6. The lining wear indicator as in claim 5, wherein the registry portion includes an aperture in the hollow portion.

7. The lining wear indicator as in claim 3, wherein the insert includes an alignment portion.

8. The lining wear indicator as in claim 7, wherein the alignment portion includes at least one flat surface.

9. The lining wear indicator as in claim 7, wherein the alignment portion is proximate the first end relative to the second end.

10. The lining wear indicator as in claim 3, wherein the second end is shaped as a hemisphere (9).

11. The lining wear indicator as in claim 1, wherein the spacer is elongated along an axis and includes at least one recess extending parallel to the axis, the recess having a transverse profile corresponding to the wire.

12. The lining wear indicator as in claim 1, wherein the coating includes a plastic extrusion.

13. A braking arrangement for a rotating body, the braking arrangement comprising:
   a lining adapted to contiguously engage the rotating body during braking, the lining having an initial dimension that is reduced to a minimum dimension due to the braking; and
   a bent lining wear indicator signaling that the lining has been reduced to the minimum dimension, the lining wear indicator including:
   a spacer providing a bending form;
   a wire contiguously engaging the spacer;
   an insert generally surrounding the wire contiguously engaging the spacer; and
   a coating encapsulating at least a portion of the insert generally surrounding the wire contiguously engaging the spacer.

14. The braking arrangement according to claim 13, wherein the lining wear indicator is adapted to be reduced by contiguous engagement with the rotating body.

15. A method of automatically manufacturing a bent lining wear indicator for vehicle brakes, the method comprising:

provinding a spacer having a longitudinal axis and at least one recess extending parallel to the axis;

producing a first sub-assembly by laying a wire in the at least one recess along the spacer;

producing a second sub-assembly by positioning the sub-assembly inside a hollow cylindrical insert (4); and producing a third sub-assembly by bending the second sub-assembly.

16. The method as in claim 15, further comprising:

inserting the third sub-assembly into an injection mold;

producing a fourth sub-assembly by extrusion-coating at least a part of the third sub-assembly with plastic; and removing the fourth sub-assembly from the injection mold.

17. The method as in claim 16, further comprising:

providing a controller interrelating the producing the first sub-assembly, the producing the second sub-assembly, the producing the third sub-assembly, the inserting, the producing the fourth sub-assembly, and the removing.

18. The method as in claim 15, wherein the providing a spacer includes forming the at least one recess with a transverse profile corresponding to the wire.

19. The method as in claim 15, wherein the producing the second sub-assembly includes bending the wire into a bight around the spacer.

* * * * *